United States Patent
Klinger (10) Patent No.: US 12,223,675 B2
(45) Date of Patent: Feb. 11, 2025

(54) METHOD FOR ASCERTAINING AN ARTICULATION ANGLE, PROCESSING UNIT, AND VEHICLE

(71) Applicant: ZF CV SYSTEMS GLOBAL GMBH, Bern (CH)

(72) Inventor: Tobias Klinger, Springe (DE)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 0 days.

(21) Appl. No.: 18/698,020

(22) PCT Filed: Sep. 23, 2022

(86) PCT No.: PCT/EP2022/076555
§ 371 (c)(1),
(2) Date: Apr. 3, 2024

(87) PCT Pub. No.: WO2023/061731
PCT Pub. Date: Apr. 20, 2023

(65) Prior Publication Data
US 2024/0331193 A1    Oct. 3, 2024

(30) Foreign Application Priority Data
Oct. 15, 2021    (DE) .................... 10 2021 126 816.8

(51) Int. Cl.
*G06T 7/73* (2017.01)
*G06T 3/06* (2024.01)
(Continued)

(52) U.S. Cl.
CPC .................. *G06T 7/73* (2017.01); *G06T 3/06* (2024.01); *G06T 3/60* (2013.01); *G06T 7/207* (2017.01);
(Continued)

(58) Field of Classification Search
CPC .... G06T 7/73; G06T 3/06; G06T 3/60; G06T 7/207; G06T 7/55; G06T 2207/10028; G06T 2207/30252
See application file for complete search history.

(56) References Cited

U.S. PATENT DOCUMENTS

2006/0293800 A1    12/2006   Bauer et al.
2008/0231701 A1     9/2008   Greenwood et al.
(Continued)

FOREIGN PATENT DOCUMENTS

DE         10302545 A1    7/2004
DE    102004025252 B4     7/2009
(Continued)

OTHER PUBLICATIONS

Saxe et al., Camera-Based Articulation Angle Sensing for Heavy Goods Vehicles, IEEE Transactions on Vehicular Technology, Jun. 2021, pp. 7522-7535, vol. 70, No. 8, IEEE; USA, DOI: 10.1109/TVT.2021.3091759.

*Primary Examiner* — Chan S Park
*Assistant Examiner* — Daniel C Chang
(74) *Attorney, Agent, or Firm* — LEYDIG, VOIT & MAYER, LTD.

(57) ABSTRACT

A method for determining an articulation angle between a towing vehicle and a trailer, wherein the trailer can be imaged in single images with single-image pixels using a camera system. The method includes determining a point cloud from at least one single image and forming at least one planar reference surface from adjacent object points of the point cloud that lie in a same plane. The method further includes reading in at least one single image, in which the trailer coupled to the towing vehicle is imaged, and determining at least one partial surface and fitting the at least one previously formed planar reference surface to the at least one determined partial surface by applying a geometric (Continued)

transformation. The method further includes determining the articulation angle between the towing vehicle and the trailer as a function of a rotational component of the applied geometric transformation.

19 Claims, 4 Drawing Sheets

(51) Int. Cl.
  *G06T 3/60* (2024.01)
  *G06T 7/207* (2017.01)
  *G06T 7/55* (2017.01)
(52) U.S. Cl.
  CPC ...... *G06T 7/55* (2017.01); *G06T 2207/10028* (2013.01); *G06T 2207/30252* (2013.01)

(56) References Cited

U.S. PATENT DOCUMENTS

| | | |
|---|---|---|
| 2014/0200759 A1 | 7/2014 | Lu et al. |
| 2014/0277942 A1 | 9/2014 | Kyrtsos et al. |
| 2016/0052548 A1 | 2/2016 | Singh et al. |
| 2017/0106796 A1 | 4/2017 | Lavoie et al. |
| 2018/0039266 A1 | 2/2018 | Dotzler et al. |
| 2018/0229658 A1 | 8/2018 | Lavoie |
| 2018/0365509 A1 | 12/2018 | Naserian et al. |
| 2019/0337342 A1 | 11/2019 | Genheimer et al. |
| 2019/0337343 A1* | 11/2019 | Ramirez Llanos ....... G06T 7/70 |
| 2019/0339708 A1* | 11/2019 | Ramirez Llanos ...... B60D 1/36 |
| 2019/0353478 A1 | 11/2019 | Deng et al. |
| 2020/0143174 A1 | 5/2020 | Luo et al. |
| 2020/0215992 A1* | 7/2020 | Plowman ................. B60D 1/36 |
| 2020/0307328 A1 | 10/2020 | Köster |
| 2020/0402257 A1* | 12/2020 | Jin ............................ G06T 7/74 |
| 2022/0161619 A1 | 5/2022 | Klinger et al. |

FOREIGN PATENT DOCUMENTS

| | | |
|---|---|---|
| DE | 102008045436 A1 | 3/2010 |
| DE | 102010006521 A1 | 9/2010 |
| DE | 102012006206 A1 | 10/2013 |
| DE | 102016121514 A1 | 5/2017 |
| DE | 102016209418 A1 | 11/2017 |
| DE | 102016011324 A1 | 3/2018 |
| DE | 102018005118 A1 | 12/2018 |
| DE | 102018114730 A1 | 12/2018 |
| DE | 102017119968 A1 | 2/2019 |
| DE | 102006040879 B4 | 4/2019 |
| DE | 102017011177 A1 | 6/2019 |
| DE | 102019007205 A1 | 8/2020 |
| DE | 102019103742 A1 | 8/2020 |
| DE | 102019106275 A1 | 9/2020 |
| DE | 102019110018 A1 | 10/2020 |
| DE | 102019115789 A1 | 12/2020 |
| EP | 2551132 B1 | 11/2015 |
| EP | 3537382 A1 | 9/2019 |
| EP | 3180769 B1 | 12/2019 |
| JP | 2002012172 A | 1/2002 |
| WO | WO 2008064892 A1 | 6/2008 |
| WO | WO 2018060192 A1 | 4/2018 |
| WO | WO 2018210990 A1 | 11/2018 |
| WO | WO-2019202317 A1 * | 10/2019 |

* cited by examiner

METHOD FOR ASCERTAINING AN ARTICULATION ANGLE, PROCESSING UNIT, AND VEHICLE

CROSS REFERENCE TO RELATED APPLICATIONS

This application is a U.S. National Phase application under 35 U.S.C. § 371 of International Application No. PCT/EP2022/076555, filed on Sep. 23, 2022, and claims benefit to German Patent Application No. DE 10 2021 126 816.8, filed on Oct. 15, 2021. The International Application was published in German on Apr. 20, 2023 as WO 2023/061731 A1 under PCT Article 21 (2).

FIELD

The invention relates to a method for determining an articulation angle, a processing unit for carrying out the method, and a vehicle having the processing unit.

BACKGROUND

The estimation of an articulation angle between a towing vehicle and a trailer coupled to it is necessary, for example, for stability functions or driver assistance functions. The articulation angle can be estimated, for example, by determining a trailer pose or a trailer orientation in three-dimensional space, which is conventionally carried out by means of a corresponding sensor system on the towing vehicle and/or by means of image processing. For example, provision is made to localize a trailer in space by means of LIDAR sensors or 3D stereo cameras and/or to estimate a trailer position and/or trailer orientation by means of additional planar marker structures (QR codes or Aruco markers) on the trailer. Furthermore, it is known from the prior art how photogrammetric methods can be used with a monocular camera to determine the structure of the scene in 3D by means of the forward or backward movement of a vehicle on which the camera is mounted can be used (so-called Structure from Motion (SfM)).

Documents DE 10 2016 011 324 A1, DE 10 2018 114 730 A1, WO 2018/210990 A1 or DE 10 2017 119 968 A1, for example, describe how to derive a trailer position and a trailer orientation of the respective object or trailer relative to the camera or the towing vehicle by means of image processing. According to these, for example, an articulation angle or a distance can be determined. Also using a mono camera, the trailer pose can be determined by localizing at least three markers, which are preferably applied as flat structures on the trailer, in a captured single image and, with knowledge of the marker positions on the trailer, a transformation matrix is determined from which the trailer pose can be derived.

Detection of an articulation angle using a camera is also described in US 2014 200759 A, wherein a flat marker on the trailer is observed from the towing vehicle over time and the articulation angle is estimated from this. Documents JP 2002 012 172 A, US2014277942A1, U.S. Pat. Nos. 2,008,231 701 A and 20,171,06796 A also describe an angle of articulation detection as a function of flat markers. In U.S. Pat. No. 2,006,293 800 A, coupling points can carry a marker to facilitate automatic detection. The marker can have a special color, texture, or wave reflection property. In DE 10 2004 025 252 B4 it is further described how to determine the articulation angle by sending radiation from a transmitter to a semicircular or hemispherical reflector and subsequently detecting the radiation reflected from it. DE 103 025 45 A1 also describes the detection of a coupling using an object detection algorithm. EP 3 180 769 B1 also describes how to capture a rear of a trailer using cameras and to recognize traceable features, e.g. an edge or corner, from the image. These are then tracked over time, in particular to infer an articulation angle between the towing vehicle and the trailer.

In U.S. Pat. No. 2,018,039 266 A it is described additionally how information of a two-dimensional barcode or QR code can be used. In DE 10 2016 209 418 A1, a QR code can also be scanned with a camera to identify the trailer and to pass trailer parameters on to a reversing assistance system. Alternatively or as a supplement, an RFID reader located on the trailer can scan an RFID transponder which is attached to the towing vehicle, for example in the form of a label. This allows a position of the QR code or RFID transponder to be calculated. Orientation is not determined. WO18060192A1 also provides a solution using radio-based transponders. In DE 10 2006 040 879 B4, RFID elements on the trailer are also used for triangulation while approaching.

In WO 2008064892 A1, an observation element is provided which comprises at least three auxiliary points or measurement points that can be detected by a camera. Geometric considerations are used to determine the coordinates or vectors of the focal points of the auxiliary points and from these, to determine the coordinates of the measuring points relative to the camera or image sensor. An articulation angle can be determined from this.

Disadvantages of the described solutions is that these methods or systems include: they are either very complex to carry out or rely on cost-intensive sensors and markers or similar to be additionally attached, or detection of the markers is not reliably possible under different ambient conditions. For example, flat markers cannot be reliably detected in darkness and/or under extreme or low viewing angles, which means the trailer pose or the articulation angle of the trailer relative to the towing vehicle cannot be reliably determined. Moreover, trailers without such markers cannot be localized.

DE 10 2008 045 436 A1 further provides for imaging the trailer in a single image and comparing the single image with a stored reference image. In each reference image, the trailer is represented with a different articulation angle relative to the towing vehicle, so that the articulation angle can be estimated if the individual image and the reference image match accordingly. For articulation angle determination, a reference image must be acquired for each articulation angle.

DE 10 2010 006 521 A1 further describes how to determine the angle of articulation by means of flow vectors, wherein the flow vectors are determined from chronologically consecutive individual images. In DE 10 2016 121 514 A1, the articulation angle is calculated from the position of a rear edge of the trailer, estimated by image processing. In DE 10 2019 103 742 A1, the articulation angle is determined from sensor data using two different algorithms. In DE 10 2019 106 275 A1, a pattern is projected onto a sub-region of a partial vehicle and the articulation angle is determined from the change in the imaged pattern. In DE 10 2019 110 018 A1 and DE 10 2019 115 789 A1, the articulation angle is acquired by sensors by means of an articulation angle sensor or a camera. Also in DE 10 2018 005 118 A1, EP 2 551 132 B1 or DE 10 2012 006 206 A1, the angle of articulation can be determined using a camera, in particular a monocular camera, a structure-from-motion (SfM) method being used for the purpose.

SUMMARY

In an embodiment, the present disclosure provides a method for determining an articulation angle between a towing vehicle and a trailer, wherein the trailer can be imaged in single images with single-image pixels using a camera system. The method comprises determining a point cloud from at least one single image in which at least the trailer is represented, wherein the point cloud comprises object points assigned to the trailer, and forming at least one planar reference surface from adjacent object points of the point cloud that lie in a same plane, wherein the respective planar reference surface is in a fixed spatial orientation and/or a fixed spatial position relative to the trailer. The method further comprises reading in at least one single image, in which the trailer coupled to the towing vehicle is imaged, and determining at least one partial surface in this at least one single image read in, and fitting the at least one previously formed planar reference surface to the at least one determined partial surface of the read-in single image by applying a geometric transformation. The method further comprises determining the articulation angle between the towing vehicle and the trailer as a function of a rotational component of the applied geometric transformation, wherein the rotational component of the applied geometric transformation characterizes a rotation of the planar reference surface about a pivot axis of the trailer.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the invention provides a method for determining an articulation angle between a towing vehicle and a trailer coupled to it, with which the articulation angle can be determined simply and reliably. A processing unit and a vehicle for carrying out the method are also provided.

According to an embodiment of the invention, a method is provided for determining an articulation angle between a towing vehicle and a trailer coupled to it, wherein the trailer can be imaged in single images with single-image pixels by means of a camera system, in particular with a monocular camera, wherein at least the following steps are provided:

determining a point cloud from at least one single image in which at least the trailer is imaged, wherein the point cloud consists of object points assigned to the trailer. The point cloud is preferably provided in a three-dimensional coordinate system in which the individual object points are represented via their world coordinates. The point cloud can be created by image processing methods from the at least one captured single image, preferably by a structure-from-motion (SfM) method from at least two single images acquired by a monocular camera or from a single image of a stereo camera using appropriate image processing methods. As a camera, an already existing or externally deployable rear view camera can advantageously be used, the viewing range of which is or can be aligned to the rear space of the towing vehicle, in which the trailer is normally located. For example, this can be a camera intended to comply with UNECE regulations for monitoring the rear space behind the towing vehicle.

Forming at least one planar or flat reference surface from the adjacent object points of the point cloud that lie substantially in the same plane, wherein the respective planar reference surface is in a fixed spatial orientation and/or a fixed spatial position relative to the trailer. This means that adjacent object points in the point cloud are sought, which are in the same plane and form a contiguous surface on the trailer, and these are assigned to the planar reference surface. In order to allow subsequent access to it, the at least one planar reference surface formed and/or the underlying point cloud can be stored, preferably together with the spatial orientation and/or the spatial position of the respective planar reference surface relative to the trailer, in order also to be able to subsequently access information on the spatial position.

Reading in at least one single image, in which the trailer coupled to the towing vehicle is imaged, and determining at least one partial surface in the at least one single image read in. In the coupled state, the individual image is then searched again for partial surfaces on the trailer.

Fitting the at least one previously formed and stored planar reference surface to the at least one partial surface, determined in the coupled state, of the read-in single image by applying a geometric transformation. The planar reference surface serving as a template, the relative position of which (reference orientation/reference position) on or relative to the trailer is known, is thus subsequently fitted to the partial surface of the imaged trailer in the current driving situation.

Determining the articulation angle between the towing vehicle and the trailer as a function of a rotational component of the applied geometric transformation, wherein the rotational component of the applied geometric transformation characterizes a rotation of the planar reference surface about a pivot axis of the trailer. From the transformation (rule), which maps the previously determined template or the reference surface to the partial surface from the single image of the current driving situation, only the relevant rotational component is used to estimate the changed relative position of the reference surface and thus also of the trailer and to estimate the angle of articulation from these.

Advantageously, therefore, a simple estimation of the articulation angle is made possible by a template matching procedure, wherein only a limited surface region of the trailer needs to be considered for the purpose, which preferably has a simple geometric shape, for example a rectangle. This surface region does not necessarily need to be applied to the trailer beforehand, as one or more already existing demarcated surface regions can be used. Such surface regions are automatically sought in advance on the trailer in order to determine the template or reference surface, and are discovered accordingly while traveling, so that the articulation angle can be easily estimated from geometric analysis by means of the geometric transformation. In the simplest case, therefore, only a camera system with a camera aligned to the rear space and a corresponding image processing algorithm is sufficient to determine the surface regions unambiguously. By using an SfM algorithm (SfM: Structure-from-Motion), a monocular camera is advantageously sufficient, which minimizes the cost and processing effort.

According to an embodiment of the invention, a processing unit for carrying out the method according to embodiments of the invention and a vehicle having such a processing unit are also provided.

Preferably, it is further provided that in order to determine the point cloud, the at least one single image is captured when the trailer is not yet coupled to the towing vehicle, for example during a coupling process. The reference area is thus determined based on a point cloud that is collected in a driving situation in which the towing vehicle is highly likely to move in relation to the trailer. This enables suitable reference surfaces to be extracted from the point cloud in an unambiguous and reliable manner, since the trailer is reliably, and ideally also comprehensively, captured in the point cloud in its three-dimensional shape, in particular if the point cloud is determined by an SfM algorithm.

Preferably, it is further provided that the point cloud is determined by means of the SfM algorithm from at least two single images, wherein the trailer in the at least two single images is captured from at least two different viewpoints, preferably by a monocular camera of the camera system. As a result, a point cloud can be formed from a plurality of object points, which are assigned at least to the trailer, wherein for this purpose depth information for the respective object points is obtained from the at least two single images by means of a triangulation. Thus, only two captured single images are required to generate the point cloud.

Preferably, it is further provided that the at least one planar reference surface is defined from adjacent object points which lie in the same plane, in such a way that the planar reference surface can be assigned to a region delimited or delimitable by color and/or structure consisting of adjacent single-image pixels in the at least one single image. Accordingly, the planar reference surface is not only determined from the position in a plane, but also in such a way that it can be uniquely recovered in a two-dimensional recorded image. This simplifies the fitting process or can make it more reliable, since the reference surface can be clearly recovered at a later time.

Preferably, it can be provided for this purpose that the planar reference surface is formed from the adjacent object points of the point cloud which lie in the same plane and/or to which single-image pixels with the same or at least similar color values and/or intensity values in the at least one single image are assigned. In this way, a partial surface that can be delimited by color and/or structure can be used. Accordingly, it can be provided that the at least one planar reference surface completely covers a front of the trailer, if, for example, no smaller partial surfaces delimitable by color and/or structure can be found on the trailer front, from which a uniquely delimitable reference surface can be derived, or only partially occupies the trailer front. This also allows a different partial surface or reference surface to be sought and defined depending on the type of trailer, which means that the method can be flexibly used and/or does not depend on specific patterns or markers on the trailer.

Preferably, it is further provided that adjacent single-image pixels with the same or at least similar color values and/or intensity values are assigned to the same partial surface of the read-in single image. In this way, partial surfaces can be easily identified in the image of the trailer based on the color or intensity.

It is preferably further provided that
an intermediate surface is formed from the at least one previously formed planar reference surface by means of a coordinate transformation, wherein the planar reference surface exists in a three-dimensional coordinate system and the intermediate surface in a two-dimensional coordinate system, and
the respectively formed intermediate surface is fitted to the respective partial surface of the read-in single image by means of the geometric transformation. Therefore, two processing steps are provided if the reference surface and the partial surface exist in different dimensions. In order to be able to carry out the geometric transformation or the fitting to the partial surface in this case, a coordinate transformation must also be applied, wherein the geometric and the coordinate transformation can be carried out jointly by the application of a common transformation matrix.

Preferably, it is provided that the respectively formed intermediate surface is translated and/or rotated and/or sheared and/or scaled by the geometric transformation, for example in a series of iteration steps. By means of an iterative process, the process of fitting can be carried out simply and reliably, wherein the resulting geometric transformation can then be used to determine the articulation angle from geometric considerations. To take into account different distances or sizes of the reference surface, the search or the fitting can take place at different resolution levels (known as an image pyramid).

Preferably, it is further provided that pixel-by-pixel color values and/or intensity values in the respective partial surface and in the formed intermediate surface are compared for fitting the at least one previously formed planar reference surface to the at least one determined partial surface. This means that fitting can be carried out in a simple and reliable way by searching for pixel similarities between the respective surfaces, for example in the iterative process.

Figure 1:
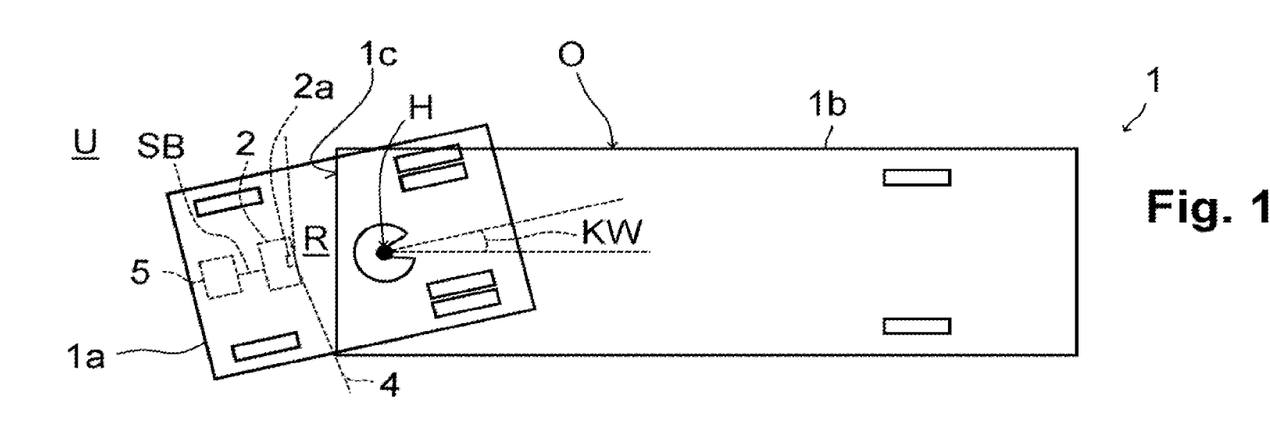
FIG. 1 shows schematic views of a vehicle.

FIG. 1 shows, in a plan view in schematized form, a vehicle 1, which consists of a towing vehicle 1a and a trailer 1b, wherein the trailer 1b in the situation shown is coupled to the towing vehicle 1a. Using a method according to an embodiment of the invention, which is described below, an articulation angle KW between the trailer 1b and the towing vehicle 1a, i.e. an angle between the longitudinal axis of the trailer and the longitudinal axis of the towing vehicle, can be determined.

For this purpose, a camera system 2 is arranged on the towing vehicle 1a, which has at least one camera 2a, in particular of monocular design, with which the surroundings U in particular behind the towing vehicle 1a can be captured. A viewing range 4 of the at least one camera 2a is thus directed in particular to a rear space R behind the towing vehicle 1a. In order to cover the entire, or at least a large, region of the surroundings U, in particular the rear space R, the camera(s) 2a can be designed, for example, as fisheye camera(s) which can cover a viewing range 4 with a viewing angle equal to or greater than 170°.

Figure 2:
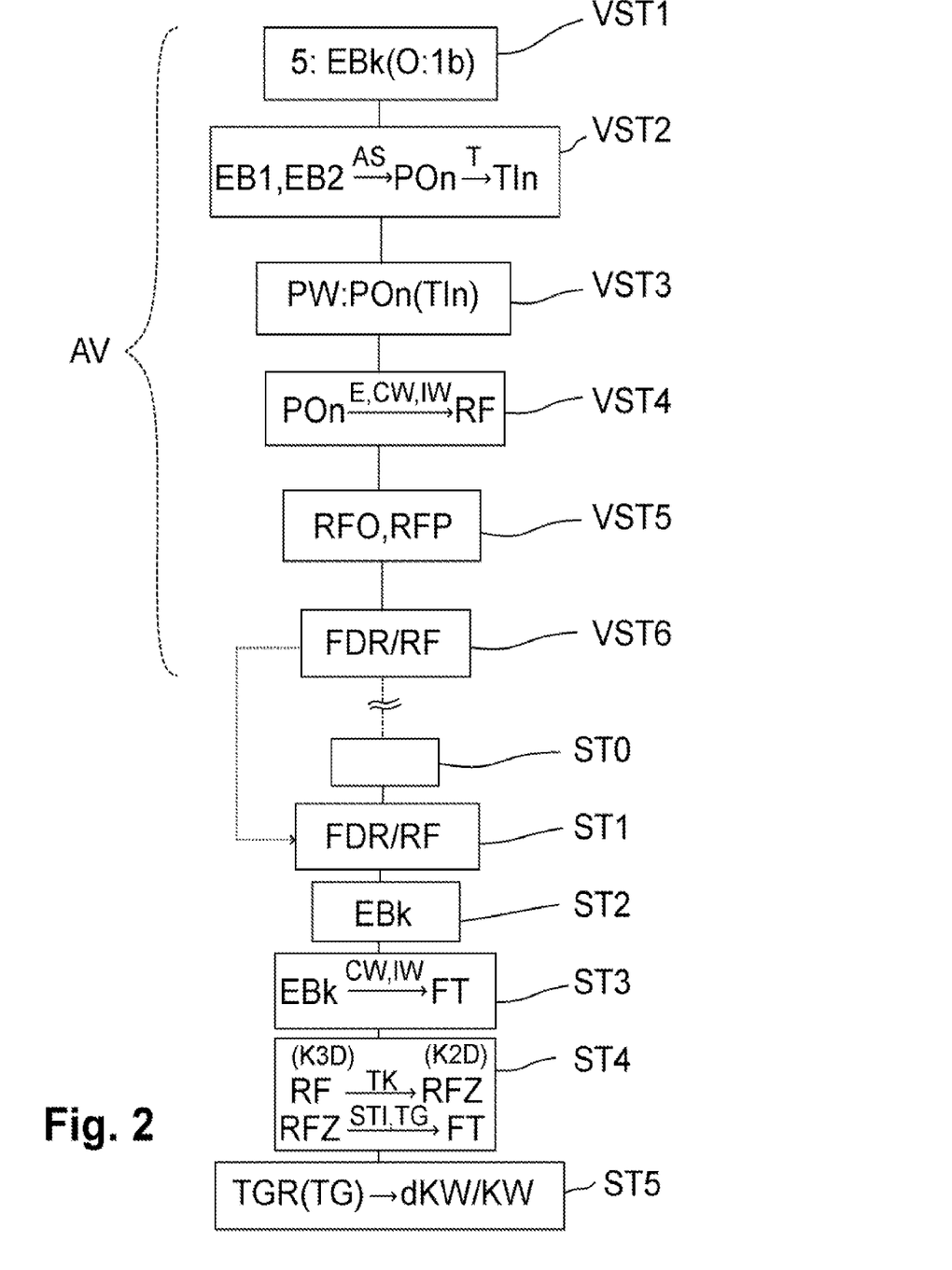
FIG. 2 shows a flow chart of the method according to an embodiment of the invention.

Image signals SB output by the respective camera 2a can be output, optionally after preprocessing, to a processing unit 5, e.g. in the towing vehicle 1a, which is designed to process single images EBk of the respective camera 2a based on the image signals SB, in order to carry out the method for determining the articulation angle KW between the towing vehicle 1a and the trailer 1b illustrated by way of example in FIG. 2.

The method is divided into two parts, wherein preliminary method steps VST1 to VST6 are carried out, for example during a coupling operation AV, and main method steps ST1 to ST5 are carried out while the vehicle 1 is operated as a combination of the towing vehicle 1a and the coupled trailer 1b, i.e. a specific articulation angle KW is set between the two. In the preliminary method steps VST1 to VST6 described below, the fact is used that the towing vehicle 1a with the camera 2a moves in relation to the trailer 1b in any case. This allows, by recourse to an SFM algorithm AS (SfM: Structure from Motion), a 3D reconstruction of the current scene to be generated by the processing unit 5 from at least two single images EBk captured by the camera 2a.

For this purpose, in a first preliminary method step VST1, two (k=1,2) or more (k=1,2, 3, . . . ) single images EBk characterizing the surroundings U of the towing vehicle 1a are firstly read in by the processing unit 5, wherein the trailer 1b to be coupled is imaged as object O on the single images EBk. The single images EBk contain a 2D representation of the current scene (scene representation in two dimensions).

Figure 3:
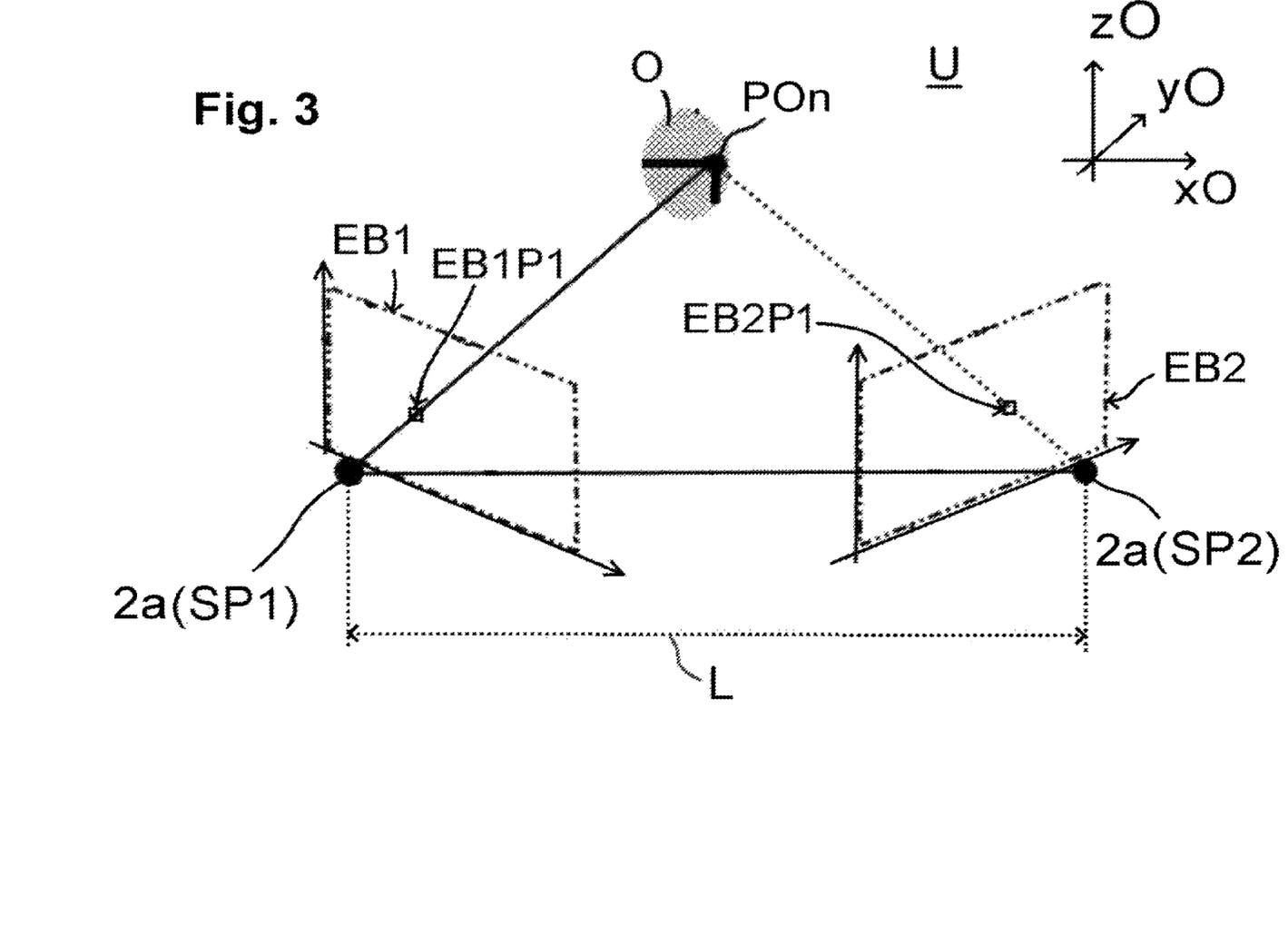
FIG. 3 shows a detailed view of an object represented in two single images from a single camera.

Subsequently, in a second preliminary method step VST2, by means of the SfM algorithm AS, depth information TIn is obtained from the at least two single images EBk for object points POn, acquired or imaged in these single images EBk (see FIG. 3), which are assigned at least to the trailer 1b in the rear space R. The extraction of depth information TIn using the SfM algorithm AS is carried out by capturing an object point POn on the trailer 1b from at least two different viewpoints SP1, SP2 by the same camera 2a, as indicated in FIG. 3.

By triangulation T, the depth information TIn with respect to each object point POn captured in pairs can then be obtained. For this purpose, image coordinates xB, yB in a two-dimensional coordinate system K2D (see FIG. 4) are determined for at least one first single-image pixel EB1P1 in a first single image EB1 and for at least one first single-image pixel EB2P1 in a second single image EB2 of the same camera 2a. Both single images EB1, EB2 are captured by the camera 2a at different viewpoints SP1, SP2, i.e. between the single images EB1, EB2, the towing vehicle 1a or the camera 2a is moved by a base length L. The first two single-image pixels EB1P1, EB2P1 are chosen in the respective single images EB1, EB2 in a known manner such that they are assigned to the same object point POn on the respectively imaged trailer 1b.

Figure 4:
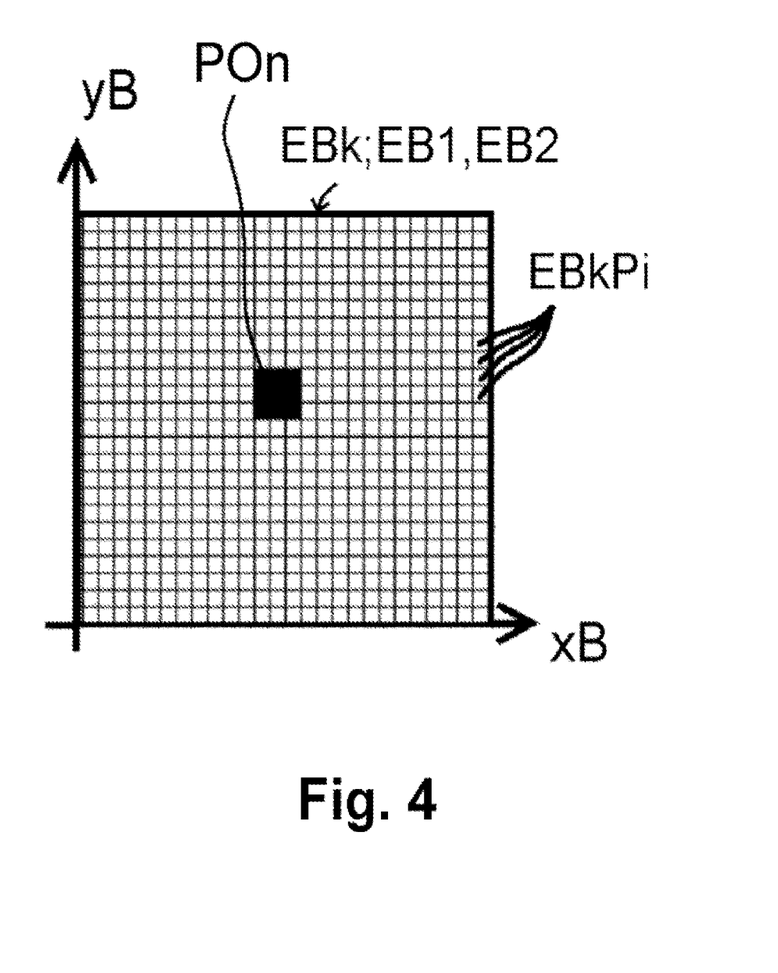
FIG. 4 shows a detail view of the single images captured.

In this way, one or more pairs of single-image pixels EB1Pi, EB2Pi for one (n=1) or more (n=1, 2, . . . ) object points POn can be determined for a trailer 1b with its object points POn. In an approximation, the absolute, actual object coordinates xO, yO, zO (world coordinates) of the respective object point(s) POn of the three-dimensional trailer 1b can be calculated or estimated by triangulation T from the image coordinates xB, yB of the single-image pixels EB1Pi, EB2Pi determined for the respective trailer 1b or the object points POn. In order to be able to carry out the triangulation T, a suitably determined base length L between the viewpoints SP1, SP2 of the camera 2a is used, for example obtained from movement data of the towing vehicle 1a and the camera 2a.

If the motion data is not available, it is also possible to determine the movement data by visual odometry, i.e. "visually" from the single images EBk, in the course of the SfM algorithm AS. To do this, the movement of the camera 2a is estimated by means of time-tracked feature points or object points POn from the single images EBk.

If the triangulation T was performed for a sufficient number of object points POn of a trailer 1b, in a third preliminary method step VST3, a three-dimensional point cloud PW of a plurality of object points POn can be generated in actual object coordinates xO, yO, zO (world coordinates) in order to describe the respective trailer 1b in three-dimensional space. Using the SfM algorithm AS, a point cloud representation PW in three-dimensional space is thus generated from the two-dimensional representation of the scene (scene representation in the single images EBk), which contains side surfaces of the trailer 1b, for example. In order to verify that this actually involves object points POn on the trailer 1b, the point cloud PW can be compared, for example, with a stored trailer model from a trailer database.

In a fourth preliminary method step VST4, one or more delimitable planar subregions on trailer 1b are sought in the point cloud PW. This is done, for example, by checking, by means of geometric considerations, whether adjacent object points POn or contiguous subsets of the point cloud PW lie in a plane E. If a plurality of object points POn of the cloud PW which are located adjacent to each other are arranged within the same plane E, allowing for a tolerance, a contiguous planar reference surface RF will be formed from these adjacent object points POn.

Preferably, the planar reference surface RF is additionally defined in such a way that it is also delimited in the single images EBk, for example in terms of color and/or structurally, so that the planar reference surface RF can also be discovered in the two-dimensional single images EBk. For the respective object points POn which are located in the same plane E, it can in some cases be additionally checked whether the same or similar color values CW and/or intensity values IW are assigned to them in the single images EBk.

The planar reference surface RF can be extended, for example, over the entire front of the trailer 1c, e.g. if there are no color-based and/or structural differences found on the front of the trailer 1c from which a uniquely delimited reference surface RF can be derived, or over subregions of the trailer front 1c, which are correspondingly delimited by color and/or structure, for example also by shading. A plurality of planar reference surfaces RF can also be discovered if contiguous object points POn in the same plane E can be found or identified in the point cloud PW.

In a fifth preliminary method step VST5, a spatial reference orientation RFO and/or a spatial reference position RFP (or the reference pose) relative to the trailer 1b is determined for each determined planar reference surface RF in order to determine their exact position in space (in 3D). The reference orientation RFO and the reference position RFP can be specified, for example, relative to the kingpin of the trailer 1b or a corner of the trailer 1b, wherein this can be derived directly from the object coordinates xO, yO, zO of the object points POn which are assigned to the respective planar reference surface RF, and/or from the known geometric dimensions of the respective trailer 1b.

Each planar reference surface RF found is then stored in a sixth preliminary method step VST6 with its corresponding spatial reference orientation RFO relative to the trailer 1b and, optionally, with its spatial reference position RFP relative to the trailer 1b (or the pose), e.g. as part of a reference representation FDR. This reference surface(s) RF or this reference representation FDR is subsequently used as a pattern or template for the determination of an articulation angle KW, by determining how the position of the reference surface(s) RF changes during the journey of the vehicle 1 relative to the towing vehicle 1a.

For this purpose, in a first main method step ST1 the stored reference surface(s) RF or the reference representation FDR is/are read in by the processing unit 5, while the trailer 1b, for which the preliminary method steps VST1 to VST6 have been previously carried out, is coupled to the towing vehicle 1a, which can be tested accordingly in advance in an initialization step ST0.

Subsequently, in a second main method step ST2, at least one single image EBk of the camera 2a is read in by the processing unit 5 while the towing vehicle 1a is operated with the coupled trailer 1b. In a third main method step ST3, one or more sub-surfaces FT is or are identified in the at least one single image EBk read in, wherein, for example, adjacent single-image pixels EBkPi with the same or similar color values CW and/or intensity values IW are assigned to the same partial surface FT.

If one or more partial surface(s) FT have been identified in this manner in the at least one single image EBk, in a fourth main method step ST4 an attempt is made to fit the read-in planar reference surface(s) RF to this/these partial surface(s) FT, for example in a series of iteration steps ST1. In this case, the read-in planar reference surface(s) RF, which are provided spatially or in a three-dimensional coordinate system KD3, is/are firstly converted into a two-dimensional coordinate system K2D by means of a coordinate transformation TK. As a result, two-dimensional intermediate surfaces RFZ are formed or generated from the planar reference surface(s) RF in order to represent the planar reference surface(s) RF (as intermediate surfaces RFZ) in the same dimension as the partial surface(s) FT. Using a geometric transformation TG, the generated intermediate surface(s) RFZ are then translated and/or rotated and/or sheared and/or scaled in an iterative process in such a way, for example, that they optimally fit the partial surface(s) FT.

For this purpose, for example, pixel similarities between a partial surface FT and a generated intermediate surface RFZ are sought in order to achieve a correct mapping, i.e. in the partial surface FT and in the intermediate surface RFZ formed, e.g. the respectively available color values CW and/or intensity values IW are compared pixel-by-pixel. If a sufficient match is found, a correct mapping between a partial surface FT and an intermediate surface RFZ (or planar reference surface RF) is assumed.

From the geometric transformation TG, via which the respective intermediate surface RFZ is fitted to the respective partial surface RF, the articulation angle KW can then be derived directly from geometric considerations in a fifth main method step ST5. The geometrical transformation TG namely converts the planar reference surface RF transformed into the two-dimensional coordinate system K2D and/or the intermediate surface RFZ thus generated, to which the reference orientation RFO determined in the fifth preliminary method step VST5 is assigned, into the partial surface FT on the trailer 1b. Thus, a rotational component TGR of the geometric transformation TG describes in particular a rotation of the generated intermediate surface RFZ about a pivot axis H of the trailer 1b (cf. coupling point between trailer 1b and towing vehicle 1a), from which the change in the position of trailer 1b relative to the towing vehicle 1a or to the camera 2a can be directly derived compared to the situation in the fifth preliminary method step VST5.

It is assumed in this case that the partial surface FT has the same reference orientation RFO relative to the trailer 1b as the respectively assigned reference surface RF, since its relative position to the trailer 1b does not change with varying articulation angle KW, but only the relative position to the towing vehicle 1a or to the camera 2a. From geometric considerations, the change in the position of the trailer 1b relative to the towing vehicle 1a or to the camera 2a then immediately results in a change of inclination angle dKW and from this, via a corresponding calibration carried out in advance, also in the angle of inclination KW itself.

For each acquired single image EBk, the current articulation angle KW can thus be determined using the planar reference surface(s) RF. If this is carried out for a plurality of reference surfaces RF parallel to one another, plausibility can also be checked by comparing the articulation angles KW derived from different reference surfaces RF.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS (PART OF THE DESCRIPTION)

1 vehicle
1a towing vehicle
1b trailer
1c trailer
2 camera system
2a camera
4 viewing range
5 processing unit
AS SfM algorithm
AV coupling procedure
CW color values
dKW articulation angle change
E level
EBk k-th single image
EBkPi i-th single-image pixel in the k-th image EBk
FDR reference representation
FT partial surface
H pivot axis
IW intensity value
K2D two-dimensional coordinate system K3D three-dimensional coordinate system
KW articulation angle
L base length
O object
POn n-th object point
PW point cloud
R rear space
RF planar reference surface
RFO reference orientation of the planar reference surface RF
RFP reference position of the planar reference surface RF
RFZ intermediate surface
SB image signal
SP1 1st viewpoint
SP2 2nd viewpoint
ST1 iteration steps
T triangulation
TG geometric transformation
TGR rotational component of the geometric transformation TG
TIn depth information
TK coordinate transformation
U surroundings
xB, yB image coordinates
xO, y, zO object coordinates
VST1-VST6 preliminary method steps
ST1-ST5 main method steps

The invention claimed is:

1. A method for determining an articulation angle between a towing vehicle and a trailer coupled to the towing vehicle, wherein the trailer can be imaged in single images with single-image pixels using a camera system, the method comprising:
   determining a point cloud from at least one single image in which at least the trailer is represented, wherein the point cloud comprises object points assigned to the trailer and wherein the at least one single image is captured when the trailer is not coupled to the towing vehicle;
   forming at least one planar reference surface corresponding to a contiguous surface of the trailer from adjacent object points of the point cloud that lie in a same plane, wherein the respective planar reference surface is in a fixed spatial orientation and/or a fixed spatial position relative to the trailer;
   reading in at least one single image, in which the trailer coupled to the towing vehicle is imaged, and determining at least one partial surface in this at least one single image read in;
   fitting the at least one planar reference surface to the at least one determined partial surface of the read-in single image by applying a geometric transformation; and
   determining the articulation angle between the towing vehicle and the trailer as a function of a rotational component of the applied geometric transformation, wherein the rotational component of the applied geometric transformation characterizes a rotation of the planar reference surface about a pivot axis of the trailer.

2. The method as claimed in claim 1, wherein the point cloud determined from the at least one single image and/or the at least one planar reference surface that is formed is stored.

3. The method as claimed in claim 1, wherein the point cloud is determined by a Structure from Motion algorithm from at least two single images, and wherein the trailer in the at least two single images is captured from at least two different viewpoints.

4. The method as claimed in claim 2, wherein the point cloud is formed from a plurality of object points, which are assigned at least to the trailer, and wherein for this purpose depth information for the respective object points is obtained from at least two single images by triangulation.

5. The method as claimed in claim 1, wherein the at least one planar reference surface is defined from adjacent object points which lie in the same plane, such that the planar reference surface can be assigned to a region delimited or delimitable by color and/or structure comprising adjacent single-image pixels in the at least one single image.

6. The method as claimed in claim 5, wherein the planar reference surface is formed from the adjacent object points of the point cloud which lie in the same plane and/or to which single-image pixels with the same or at least similar color values and/or intensity values in the at least one single image are assigned.

7. The method as claimed in claim 1, wherein the at least one planar reference surface completely covers a trailer front or only partially occupies the trailer front.

8. The method as claimed in claim 1, wherein adjacent single-image pixels with the same or at least similar color values and/or intensity values are assigned to the same partial surface of the read-in single image.

9. The method as claimed in claim 1, further comprising:
   forming an intermediate surface from the at least one previously formed planar reference surface by means of a coordinate transformation, wherein the planar reference surface exists in a three-dimensional coordinate system and the intermediate surface in a two-dimensional coordinate system; and
   fitting the respectively formed intermediate surface to the respective partial surface of the read-in single image by the geometric transformation.

10. The method as claimed in claim 9, wherein the respectively formed intermediate surface is translated and/or rotated and/or sheared and/or scaled by the geometric transformation.

11. The method as claimed in claim 9, wherein pixel-by-pixel color values and/or intensity values in the respective partial surface and in the formed intermediate surface are compared for fitting the at least one previously formed planar reference surface to the at least one determined partial surface.

12. A processing unit for a vehicle including a towing vehicle and a trailer the processing unit being configured to:
   determine a point cloud from at least one single image captured by a camera system, in which at least the trailer is imaged, wherein the point cloud comprises object points assigned to the trailer and wherein the at least one single image is captured when the trailer is not coupled to the towing vehicle;
   form at least one planar reference surface corresponding to a contiguous surface of the trailer from the adjacent object points of the point cloud that lie in a same plane, wherein the respective planar reference surface is in a fixed spatial orientation and/or a fixed spatial position relative to the trailer;
   read in at least one single image, in which the trailer coupled to the towing vehicle is imaged, and to determine at least one partial surface in this at least one single image read in;

fit at least one previously formed planar reference surface to the at least one determined partial surface by applying a geometric transformation; and determine an articulation angle between the towing vehicle and the trailer as a function of a rotational component of the applied geometric transformation, wherein the rotational component of the applied geometric transformation characterizes a rotation of the planar reference surface about a pivot axis of the trailer.

13. A vehicle comprising:
a towing vehicle;
a trailer;
the processing unit as claimed in claim 12; and
a camera system, the viewing range of which is or can be aligned to the trailer in a rear space of the towing vehicle.

14. The method as claimed in claim 1, wherein to determine the point cloud, the at least one single image is captured during a coupling process.

15. The method as claimed in claim 2, wherein the point cloud determined from the at least one single image and/or the at least one planar reference surface that is formed is stored with the spatial orientation and/or the spatial position of the respective planar reference surface relative to the trailer.

16. The method as claimed in claim 3, wherein the trailer in the at least two single images is captured from at least two different viewpoints by a monocular camera of the camera system.

17. The method as claimed in claim 10, wherein the respectively formed intermediate surface is translated and/or rotated and/or sheared and/or scaled by the geometric transformation in a series of iteration steps.

18. The vehicle as claimed in claim 13, wherein the camera system includes a monocular camera.

19. A method for determining an articulation angle between a towing vehicle and a trailer coupled to the towing vehicle, wherein the trailer can be imaged in single images with single-image pixels using a camera system, the method comprising:

determining a point cloud from at least one single image in which at least the trailer is represented, wherein the point cloud comprises object points assigned to the trailer;

forming at least one planar reference surface from adjacent object points of the point cloud that lie in a same plane, wherein the respective planar reference surface is in a fixed spatial orientation and/or a fixed spatial position relative to the trailer;

reading in at least one single image, in which the trailer coupled to the towing vehicle is imaged, and determining at least one partial surface in this at least one single image read in;

fitting the at least one planar reference surface to the at least one determined partial surface of the read-in single image by applying a geometric transformation; and determining the articulation angle between the towing vehicle and the trailer as a function of a rotational component of the applied geometric transformation, wherein the rotational component of the applied geometric transformation characterizes a rotation of the planar reference surface about a pivot axis of the trailer, wherein the at least one planar reference surface is defined from adjacent object points which lie in the same plane, such that the planar reference surface can be assigned to a region delimited or delimitable by color and/or structure comprising adjacent single-image pixels in the at least one single image, and wherein the planar reference surface is formed from the adjacent object points of the point cloud which lie in the same plane and/or to which single-image pixels with the same or at least similar color values and/or intensity values in the at least one single image are assigned.

* * * * *